UNITED STATES PATENT OFFICE.

CHARLES H. FRINGS, OF WASHINGTON, DISTRICT OF COLUMBIA, ASSIGNOR, BY DIRECT AND MESNE ASSIGNMENTS, TO THE NEW ERA BREWING COMPANY OF MILWAUKEE, WISCONSIN.

PROCESS OF PREPARING MALTED BEVERAGES.

SPECIFICATION forming part of Letters Patent No. 301,710, dated July 8, 1884.

Application filed September 9, 1882. (No specimens.)

*To all whom it may concern:*

Be it known that I, CHARLES H. FRINGS, a citizen of the United States, residing at Washington, in the District of Columbia, have invented a new and useful Process of Manufacturing Malted Beverages; and I hereby declare the following to be a full, clear, and exact description of the same.

My invention relates to the process of manufacturing that class of non-alcoholic and effervescing beverages into the composition of which an extract of cereals malted or acted upon by malt enters. Such extracts always contain more or less valuable nitrogenous substances, ("albuminoids,") a part of which are compatible with carbonic acid, while at the same time another part will be separated in the carbonated beverage, thus rendering it unsightly and unmerchantable. The old method of manufacturing non-alcoholic and carbonated beverages, which method offers no remedy for the removal of the separating substances, is therefore not applicable to the manufacture of malted beverages retaining albuminoids in solution, while freed of its incompatibles. On the other hand, in the manufacture of fermented malt-liquors—such as lager-beer and the like—a clear and sparkling beverage is produced, which, although fully saturated with carbonic acid, will hold in perfect solution a considerable amount of nitrogenous matter or albuminoids. To obtain this result, the vessel in which the so-called "after-fermentation" takes place is tightly closed, "bunged," and thereby the generating carbonic-acid gas, which before was allowed to escape, forced to accumulate in the vessel. This serves for two purposes—first, to saturate the liquor with carbonic acid under a certain pressure, the amount of which is controlled and regulated in many breweries automatically; and, secondly, to aid by the said pressure the precipitation of all feculous matter, and all substances incompatible with the degree of saturation produced, so that the beverage under the given pressure becomes clear and sparkling above the sediment formed. To accelerate the precipitation of such fine particles which in a state of equilibrium, as it were, are loth to settle, a solution of gelatinous substances—such as isinglass and the like, called "finings"—is usually added. Now, it is the object of my invention to produce, without fermentation, a clear and effervescing malted beverage, retaining albuminoids in solution, by treating a malted liquid under pressure of carbonic-acid gas in a manner similar to that practiced in breweries, with the difference, of course, that the carbonic acid required is supplied extraneously, and not by fermentation. I proceed for this purpose as follows: A beer-wort, or any other liquid extract of cereals, malted or acted upon by malt, with the addition of hops, or, if desired, of other substances, is made, boiled, and cooled down to, and kept at, a low temperature. Certain substances will thereby become insoluble, and may be removed, either by filtration or by allowing the extract to stand till the separated matter has formed a sediment, from which the extract is drawn off. The latter is then impregnated or saturated with carbonic acid under a moderate pressure, and, if the concentration of the extract allows dilution, it may be mixed with highly-carbonated water instead of directly charging it with carbonic acid. The pressure applied must be maintained, and all substances incompatible with the presence of carbonic acid at the given degree of impregnation or saturation will separate and gradually precipitate, leaving the beverage above the sediment thus formed perfectly clear, which clarification will be facilitated and hastened by the use of finings. The finished beverage may then be racked off for shipment, while keeping the given pressure of carbonic acid during the whole operation, thereby preventing the sediment from rising up and disturbing the beverage. As to the prevention of fermentation and other decomposition, there is of course no yeast added to the extract, and, besides that, I carefully protect the extract from the moment it leaves the boiling-kettle from any contact with the atmospheric air, or paralyze the injurious effect of such contact by filtering the air through disinfected cotton-wool. Moreover, I scrupulously disinfect all vessels, tubes, pipes, and apparatuses through which the extract will pass by the use of efficient and suitable antiseptic and antizymotic agents.

What I claim as new, and desire to secure by Letters Patent, is—

The herein-described process of manufacturing a non-alcoholic and effervescing malted beverage, retaining albuminoids in solution, and having the appearance of malt liquors—such as lager-beer, ale, porter, and the like—which process consists in, first, preparing the malted extract; second, preventing fermentation in this extract; third, impregnating or saturating it with carbonic-acid gas or carbonated water; and, finally, clarifying and finishing it under pressure of carbonic-acid gas, substantially as set forth.

In testimony that I claim the foregoing as my own I have hereto affixed my signature in presence of two witnesses.

CHARLES H. FRINGS.

Witnesses:
    WM. BAGGER,
    H. J. ENNIS.